(12) United States Patent
Oskooi et al.

(10) Patent No.: US 10,120,946 B2
(45) Date of Patent: *Nov. 6, 2018

(54) EMOTIONALLY RELEVANT CONTENT

(71) Applicant: EXCALIBUR IP, LLC, Sunnyvale, CA (US)

(72) Inventors: Shirin Oskooi, San Francisco, CA (US); Dan Pelleg, Haifa (IL); Yoelle Maarek, Haifa (IL); Samiksha Harish Kothari, Mumbai (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,507

(22) Filed: Feb. 17, 2017

(65) Prior Publication Data
US 2017/0161395 A1    Jun. 8, 2017

Related U.S. Application Data

(63) Continuation of application No. 14/472,430, filed on Aug. 29, 2014, now Pat. No. 9,613,033.

(51) Int. Cl.
*G06F 17/00* (2006.01)
*G06F 17/30* (2006.01)
(Continued)

(52) U.S. Cl.
CPC ........ *G06F 17/30867* (2013.01); *G06F 3/011* (2013.01); *G06F 3/023* (2013.01);
(Continued)

(58) Field of Classification Search
CPC ............. G06F 17/30867; G06F 3/0482; G06F 3/04842
(Continued)

(56) References Cited

U.S. PATENT DOCUMENTS

| | | | | |
|---|---|---|---|---|
| 8,306,977 B1 * | 11/2012 | Gildfind | .............. | G06F 17/3064 707/734 |
| 2009/0164897 A1 * | 6/2009 | Amer-Yahia | ..... | G06F 17/30867 715/703 |

(Continued)

OTHER PUBLICATIONS

Koelstra et al., DEAP: A Database for Emotion Analysis Using Physiological Signals, IEEE 2012, pp. 18-31.*
(Continued)

*Primary Examiner* — Cong-Lac Huynh
(74) *Attorney, Agent, or Firm* — Cooper Legal Group, LLC

(57) ABSTRACT

Users may engage with content that may invoke various emotions. For example, a user may find an image as inspirational, a social network post as funny, etc. Accordingly, content may be labeled with user emotion labels, specified by users that engaged with the content, to create labeled content (e.g., the image may be labeled as inspirational). Emotional transition triggers may be defined for users (e.g., 30 minutes of a user writing a school report using a word processing application). Responsive to a triggering of an emotional transition trigger, labeled content may be provided to a user (e.g., the image may be provided to the user as an inspirational break from writing the school report). In this way, content may be labeled based upon emotions that the content invokes in users, and such labeled content may be provided to users in a contextually relevant manner (e.g., a study break).

20 Claims, 12 Drawing Sheets

(51) Int. Cl.
- *H04L 29/08* (2006.01)
- *G06F 3/01* (2006.01)
- *H04N 21/458* (2011.01)
- *H04N 21/258* (2011.01)
- *H04N 21/475* (2011.01)
- *G06F 3/023* (2006.01)
- *H04W 4/20* (2018.01)
- *G06F 3/0482* (2013.01)
- *G06F 3/0484* (2013.01)

(52) U.S. Cl.
CPC ........ *G06F 3/0482* (2013.01); *G06F 3/04842* (2013.01); *G06F 17/30056* (2013.01); *H04L 67/10* (2013.01); *H04N 21/25891* (2013.01); *H04N 21/458* (2013.01); *H04N 21/4755* (2013.01); *H04W 4/20* (2013.01); *G06F 2203/011* (2013.01)

(58) Field of Classification Search
USPC ....................................................... 715/230
See application file for complete search history.

(56) References Cited

U.S. PATENT DOCUMENTS

| | | | |
|---|---|---|---|
| 2012/0047447 A1* | 2/2012 | Haq | G06F 3/04847 715/752 |
| 2014/0108309 A1* | 4/2014 | Frank | G06N 99/005 706/12 |
| 2014/0149177 A1* | 5/2014 | Frank | G06Q 10/06 705/7.29 |
| 2015/0286698 A1* | 10/2015 | Gagnier | G06F 17/30595 707/736 |
| 2015/0332603 A1* | 11/2015 | Aravkin | G09B 5/04 434/238 |
| 2017/0052946 A1* | 2/2017 | Gu | G06F 17/279 |
| 2017/0068994 A1* | 3/2017 | Slomkowski | G06Q 30/0269 |

OTHER PUBLICATIONS

Deng et al., Emotion-based Music Recommendation Using Audio Features and User Playlist, IEEE 2001, pp. 796-801.*

* cited by examiner

EMOTIONALLY RELEVANT CONTENT

RELATED APPLICATION

This application claims priority to and is a continuation of U.S. application Ser. No. 14/472,430, filed on Aug. 29, 2014, entitled "EMOTIONALLY RELEVANT CONTENT", which is incorporated herein.

BACKGROUND

Many users perform tasks through applications and/or websites. In an example, a student may write a school report using a word processing application. In another example, a programmer may develop an application using an integrated development environment. In another example, a doctor may research medical articles provided by various websites.

SUMMARY

In accordance with the present disclosure, a user emotion label for content (e.g., a website, a website element, a question or answer from a question and answer service, a user interface element of an application, video content, an image, a social network post, an article, textual content, audio content, etc.) may be received from a first user. In an example, the user emotion label comprises a happy emotion label, a non-work emotion label, a non-school emotion label, an inspirational emotion label, a funny emotion label, or any other emotion label. In an example, the user emotion label may correspond to an emotion selected by the first user from an emotion labeling interface. In an example, the user emotion label may be crowd sourced with user emotion labels provided by a plurality of users for the content. In an example, the user emotion label may be ranked based upon a number of users that labeled the content with the user emotion label. The content may be labeled based upon the user emotion label to create labeled content.

An emotional transition trigger (e.g., a timeout trigger corresponding to a second user engaged with content having an emotional content type such as serious, work, school, etc.; a trigger corresponding to a user input pattern, such as a click rate, a typing rate, eye gaze tracking, etc., that may indicate that the second user could use a break; etc.) may be defined for the second user. Responsive to a triggering of the emotional transition trigger, the labeled content may be provided to the second user. In an example, the labeled content and/or additional labeled content may be displayed through a slide show. In an example, the labeled content may be displayed through a website interface element of a website and/or an application interface element of an application with which the second user is engaged. In an example, the labeled content may be provided based upon the user emotion label corresponding to a user emotion preference specified by the second user. In an example, the labeled content may be removed and the second user may be transitioned back to original content, with which the user was previously engaged, based upon an expiration of a threshold amount of time for which the user was engaged with the labeled content (e.g., the labeled content, such as a joke, may be provided to a student as a study break, and then the joke may be removed after a few minutes so that the student can transition back to studying).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
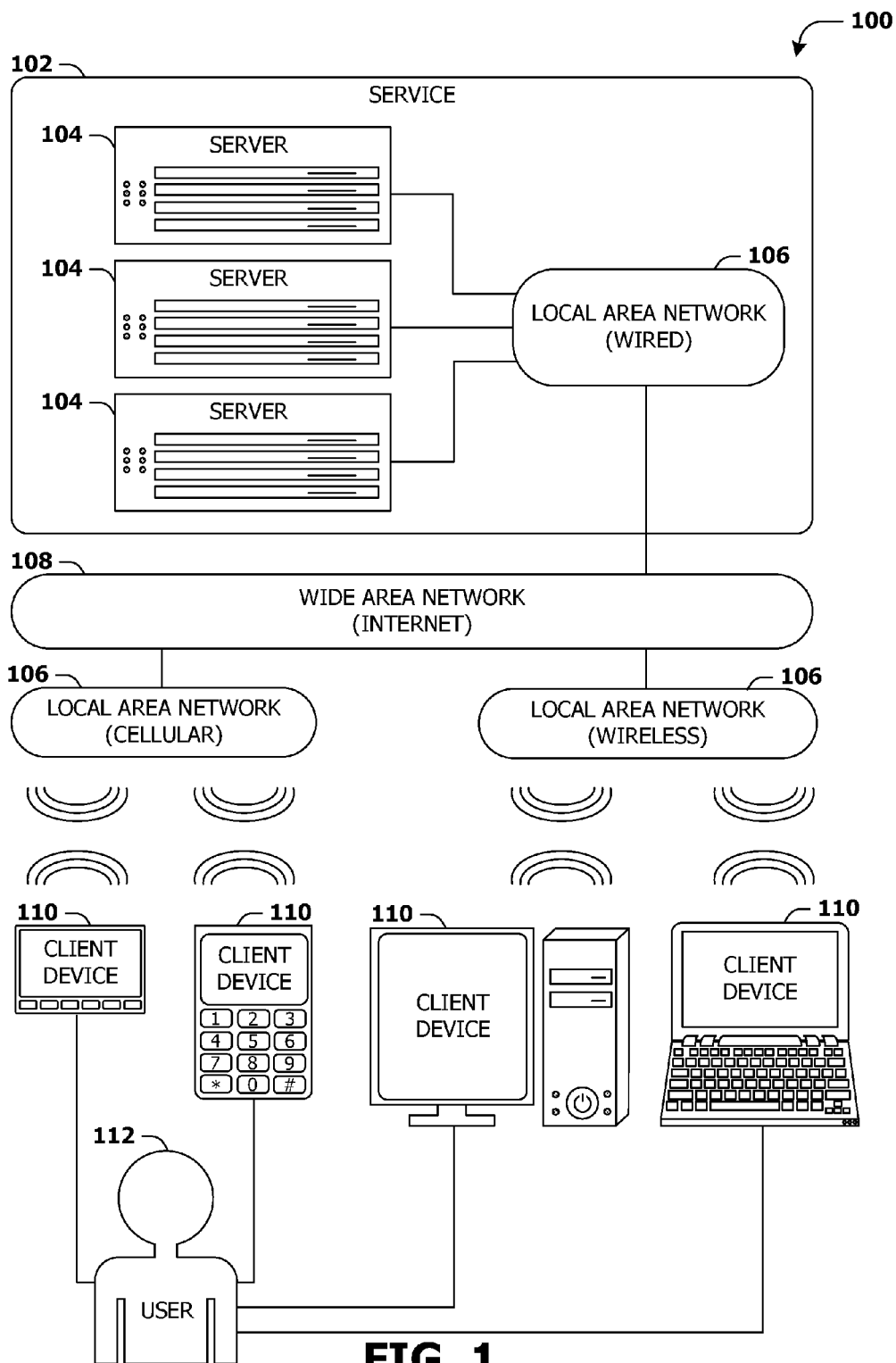
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
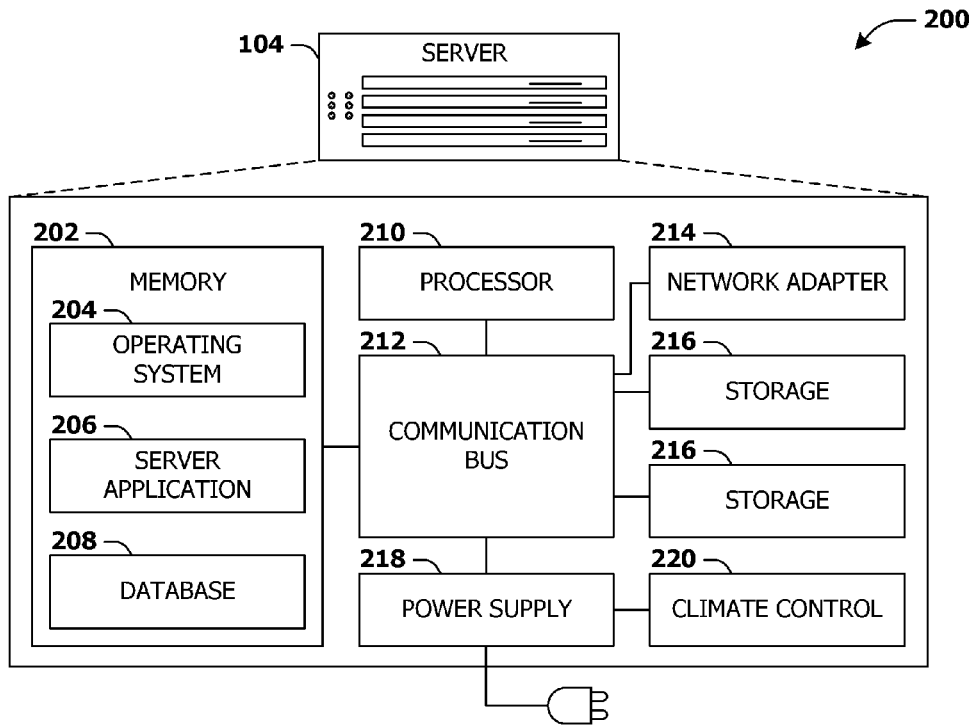
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components.

The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
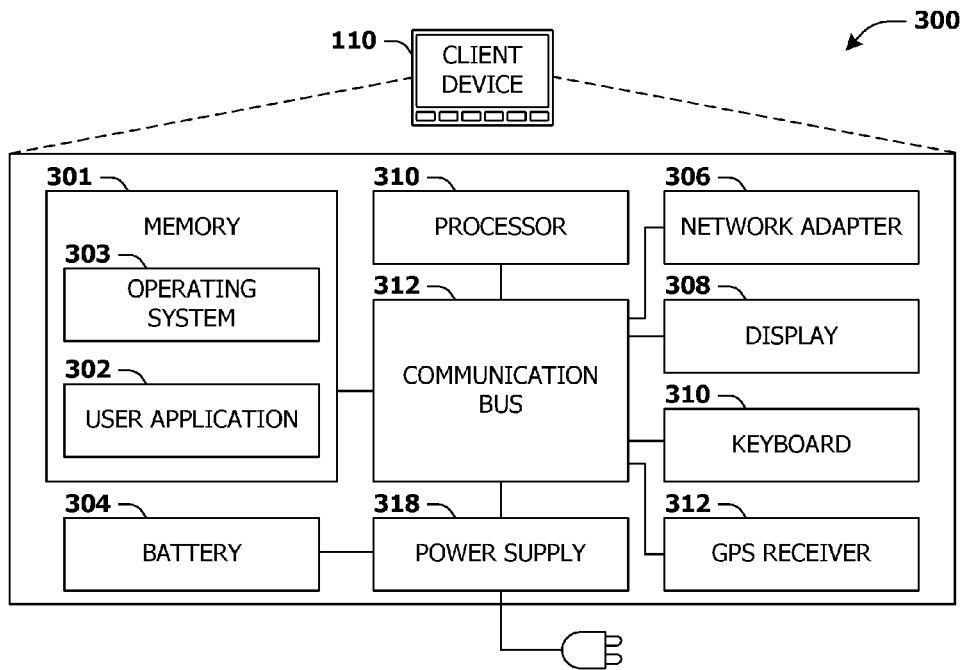
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 210 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

1. Presented Techniques

One or more systems and/or techniques for providing emotionally relevant content to users are provided herein. Many computing devices and/or environments may lack computing resources, detection techniques, and/or functionality to determine how users emotionally react to content and/or when to provide users with certain types of content that might invoke a certain reaction or emotion (e.g., a medical student may find an image as inspirational, and thus other medical students may benefit from being provided with the image as a quick study break). As provided herein, users may label content with user emotion labels (e.g., a user may label an answer within a question and answer forum as funny). Labeled content may be provided to other users based upon various emotional transition triggers, such as a timeout trigger of a user engaging in serious content (e.g., work, school, etc.) for a threshold amount of time. The ability for users to label content with user emotion labels and/or for labeled content to be provided to users based upon emotional transition triggers may reduce network bandwidth, cognitive load on a user, and/or computing resources otherwise used to provide users with emotionally irrelevant content that may not invoke a desirable emotion (e.g., providing vacation content to the medical student may invoke emotions of missing out as opposed to inspiration for continued studying). The ability for users to label content with user emotion labels and/or for labeled content to be provided to users based upon emotional transition triggers may reduce network bandwidth and/or computing resources otherwise used by users to search for such content (e.g., bandwidth and/or processing resources may be consumed where users (e.g., randomly) navigate to different content sources (e.g., websites) to find such content).

Figure 4:
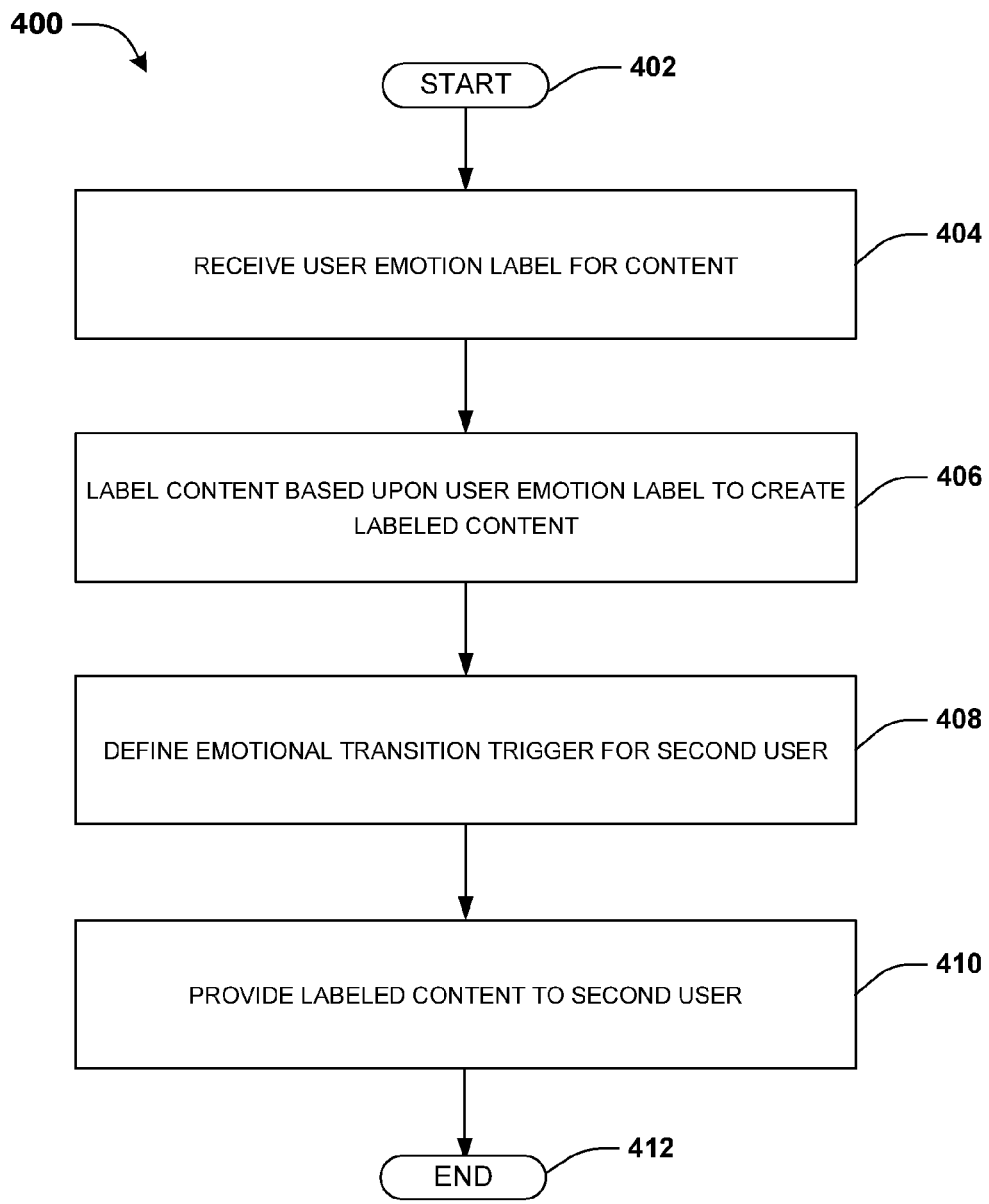
FIG. 4 is a flow chart illustrating an example method of providing emotionally relevant content to users.

An embodiment of providing emotionally relevant content to users is illustrated by an example method 400 of FIG. 4. At 402, the method starts. A first user may be consuming and/or engaging with content, such as a website, a website element (e.g., a website image, a website description of an event, etc.), a question or answer from a question and answer service, a user interface element of an application, video content, an image, a social network post, an article, textual content (e.g., a user may draw around text of a website, such as by using a gesture on a touch enabled device, to select the text for labeling), audio content, and/or any other content. At 404, a user emotion label, for the content, may be received from the first user. In an example, an emotion labeling interface may be provided to the first user. The emotion labeling interface may be populated with a set of emotions for selection by the first user (e.g., icons, a drop down list, textual labels, or other representations of emotions, such as a funny emotion, an inspirational emotion, a non-serious emotion, a non-work emotion, a non-school emotion, an entertainment emotion, or other emotions may be populated within the emotion labeling interface). For example, the user may select a funny emotion (e.g., smiley face icon) as the user emotion label for a social network post about a polar bear sliding down a slide. In this way, various content may be labeled with user emotion labels by a plurality of users so that such content may be provided to other users that might have a desire to see such emotional types of content.

In an example, a rank may be assigned to a user emotion label for content based upon various factors, such as a number of users that labeled the content with the user emotion label, a rate or frequency at which users labeled the content with the user emotion label (e.g., within a specified or threshold timespan), an amount or percentage of content that is labeled with the user emotion label, an amount or percentage of content that is not labeled with a user emotion label, an amount or percentage of content that is labeled with a different user emotion label (e.g., different than the user emotion label), etc. For example, a higher rank may be assigned to a user emotion label for content when many users labeled the content with the user emotion label, and a lower rank may be assigned to a user emotion label for content when merely a small fraction of users who were exposed to the content labeled the content with the user emotion label. Accordingly, in an example, content may be labeled with a user emotion label based upon crowd sourcing feedback. In an example, labeled content may or may not be provided to users based upon ranks assigned to such labels and/or to such labeled content (e.g., a user emotion label for content may be provided when the user emotion label for the content has a relatively higher rank, and a user emotion label for content may not be provided when the user emotion label for the content has a relatively lower rank.

At 408, an emotional transition trigger may be defined for a second user. In an example, the emotional transition trigger comprises a timeout trigger for a first emotional content type (e.g., the emotional transition trigger may trigger based upon the second user engaging with serious content, work content, educational content, or content having the first emotional content type for more than 25 minutes). In an example, the emotional transition trigger comprises a user input pattern (e.g., the emotional transition trigger may trigger based upon a typing speed pattern, a click speed pattern, an eye gaze tracking pattern, or a gesture pattern that may indicate that the second user could use a break from serious content). It may be appreciated that a wide variety of triggers may be defined as the emotional transition trigger (e.g., a threshold number of characters/words typed into a research paper; an amount of idle time with little to no user activity; a number of serious webpages visited by the second user; a user request such as a voice command "I need a break, so please show me funny content for 2 minutes as a slide show"; a user emotion preference for a particular type of content, such as videogame entertainment content, specified by the second user; etc.).

At 410, responsive to a triggering of the emotional transition trigger, the labeled content may be provided to the second user. For example, responsive to the user consuming content of the first emotional content type for a threshold amount of time corresponding to the timeout trigger (e.g., the second user may have been writing a research paper for more than 25 minutes), the labeled content (e.g., the social network post of the polar bear using the slide) may be provided to the second user. In an example, labeled content may be displayed through a website interface element of a website with which the second user is engaged (e.g., a panel of a web browser or website through which the user is conducting research for the research paper). In an example, the labeled content may be displayed through an application interface element of an application with which the second user is engaged (e.g., the social network post may be displayed through a portion of a word processing application). In an example, the labeled content may be provided to the second user for a threshold amount of time (e.g., a 2 minute break from writing the research paper). Responsive to expiration of the threshold amount of time, the labeled content may be (e.g., automatically) removed and the second user may be transitioned to the first emotional content type of content, such as the research paper. In an example, the labeled content may be displayed through a slide show. The slide show may be updated with additional labeled content based upon a slide show view setting (e.g., the slide show may be updated with various labeled content that are each displayed for 30 seconds for a total of a 3 minute slide show). In this way, labeled content may be provided to users that may have an emotional need for such content (e.g., funny content used as a quick study break). At 412, the method ends.

Figure 5:
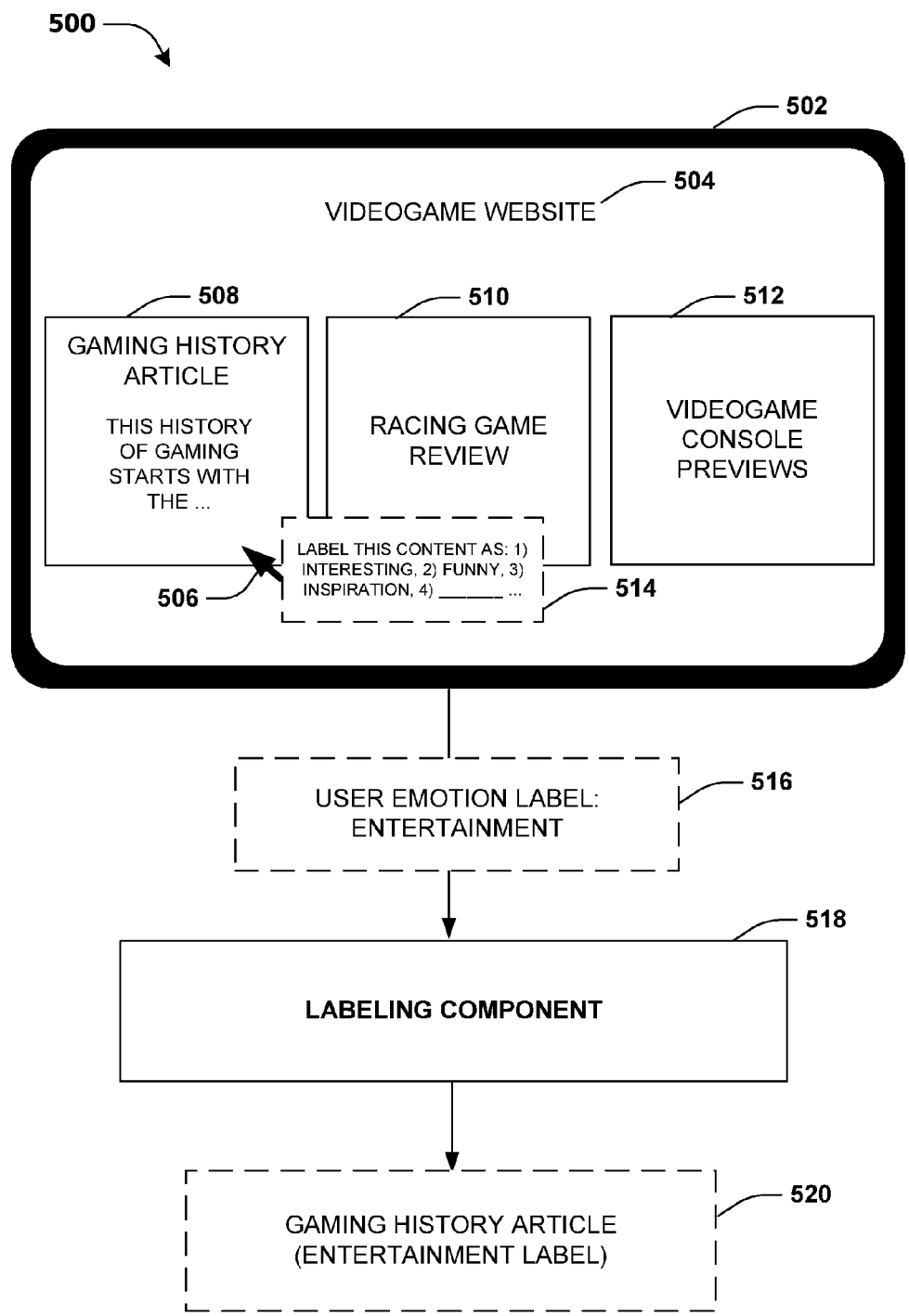
FIG. 5 is a component block diagram illustrating an example system for providing emotionally relevant content to users, where content is labeled using a user emotion label.

FIG. 5 illustrates a system 500, comprising a labeling component 518, configured to label content. The labeling component 518 may be associated with a client device 502 and/or a videogame website 504 accessed by the client device 502 (e.g., the labeling component 518 may be hosted by an operating system of the client device 502, by a service accessible to the client device 502, by a server hosting the videogame website 504, by a browser plugin, etc.). In an example, a first user of the client device 502 may access the videogame website 504. The videogame website 504 may comprise a gaming history article 508, a racing game review 510, a videogame console previews section 512, and/or other content.

The first user may select the gaming history article 508 using a cursor 506. Responsive to the selection, an emotion labeling interface 514 may be provided to the first user. The emotion labeling interface 514 may be populated with an inspirational emotion, a funny emotion, an inspiration emotion, a user specified emotion input interface, and/or other emotions. The first user may specify an entertainment emotion through the user specified emotion input interface of the emotion labeling interface 514. The entertainment emotion may be received by the labeling component 518 as a user emotion label 516. The labeling component 518 may label the gaming history article 508 with the user emotion label 516 to create a labeled gaming history article as labeled content 520.

Figure 6:
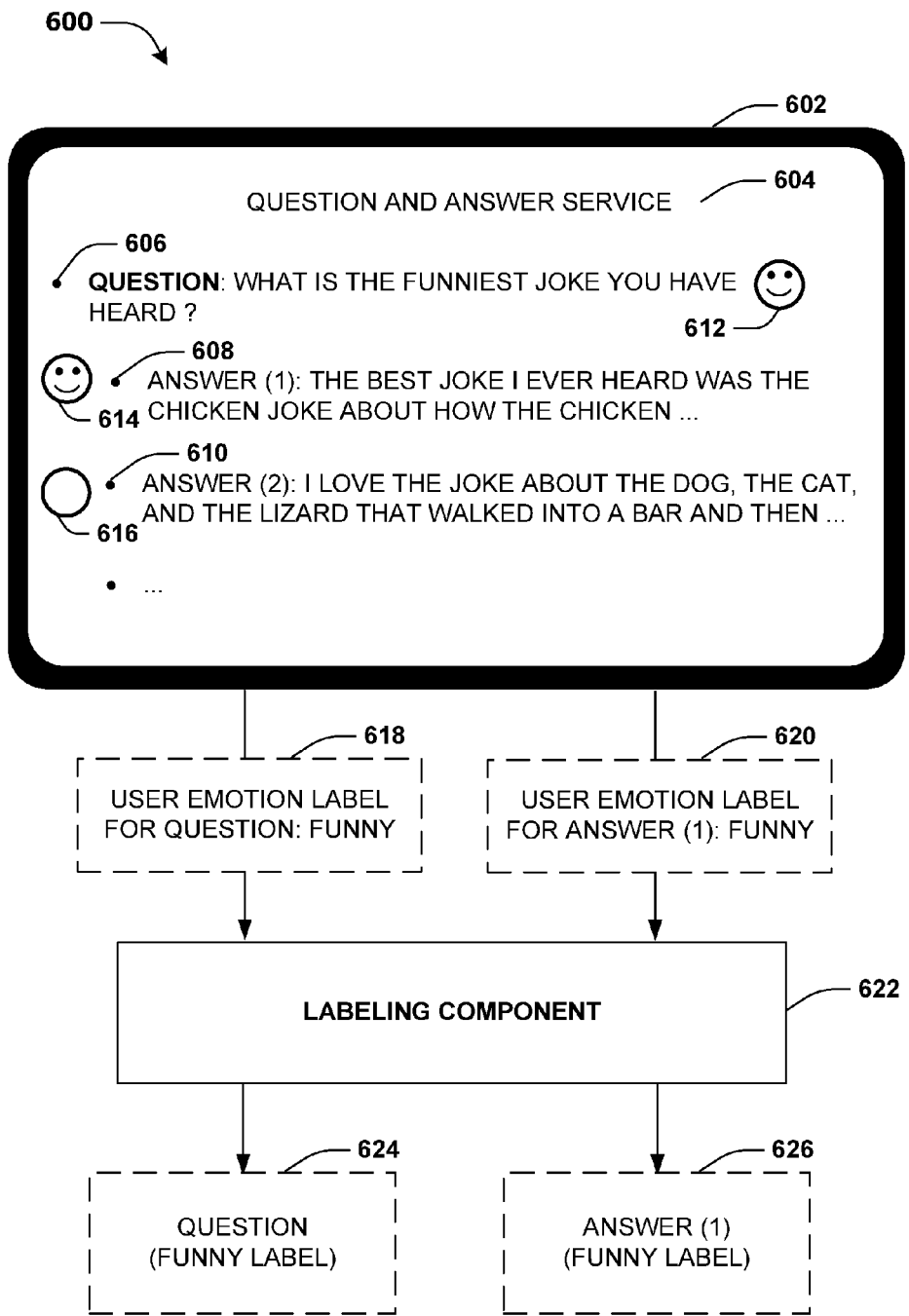
FIG. 6 is a component block diagram illustrating an example system for providing emotionally relevant content to users, where content is labeled using a user emotion label.

FIG. 6 illustrates a system 600, comprising a labeling component 622, configured to label content. The labeling component 622 may be associated with a client device 602 and/or a question and answer service 604 accessed by the client device 602 (e.g., the labeling component 622 may be hosted by an operating system of the client device 602, by a service accessible to the client device 602, by a server hosting the question and answer service 604, by a browser plugin, etc.). In an example, a first user of the client device 602 may access the question and answer service 604. The question and answer service 604 may comprise a question 606, a first answer 608, a second answer 610, and/or other content.

The labeling component 622 may populate the question and answer service 604 with one or more emotion labeling interfaces, such as a first emotion labeling interface 612 for the question 606, a second emotion labeling interface 614 for the first answer 608, and a third emotion labeling interface 616 for the second answer 610. The first user may select the first emotion labeling interface 612 for the question 606 (e.g., the first emotion labeling interface 612 may be changed from a circle to a smiley face to indicate that the user has indicating that the question 606 is funny or pertains to humor). The selection of the first emotion labeling interface 612 may be received by the labeling component 622 as a first user emotion label 618 for the question 606. The labeling component 622 may label the question 606 with the first user emotion label 618 to create a labeled question as first labeled content 624. The first user may select the second emotion labeling interface 614 for the first answer 608 (e.g., the second emotion labeling interface 614 may be changed from a circle to a smiley face to indicate that the user has indicating that the first answer 608 is funny). The selection of the second emotion labeling interface 614 may be received by the labeling component 622 as a second user emotion label 620 for the first answer 608. The labeling component 622 may label the first answer 608 with the second user emotion label 620 to create a labeled first answer as second labeled content 626.

Figure 7:
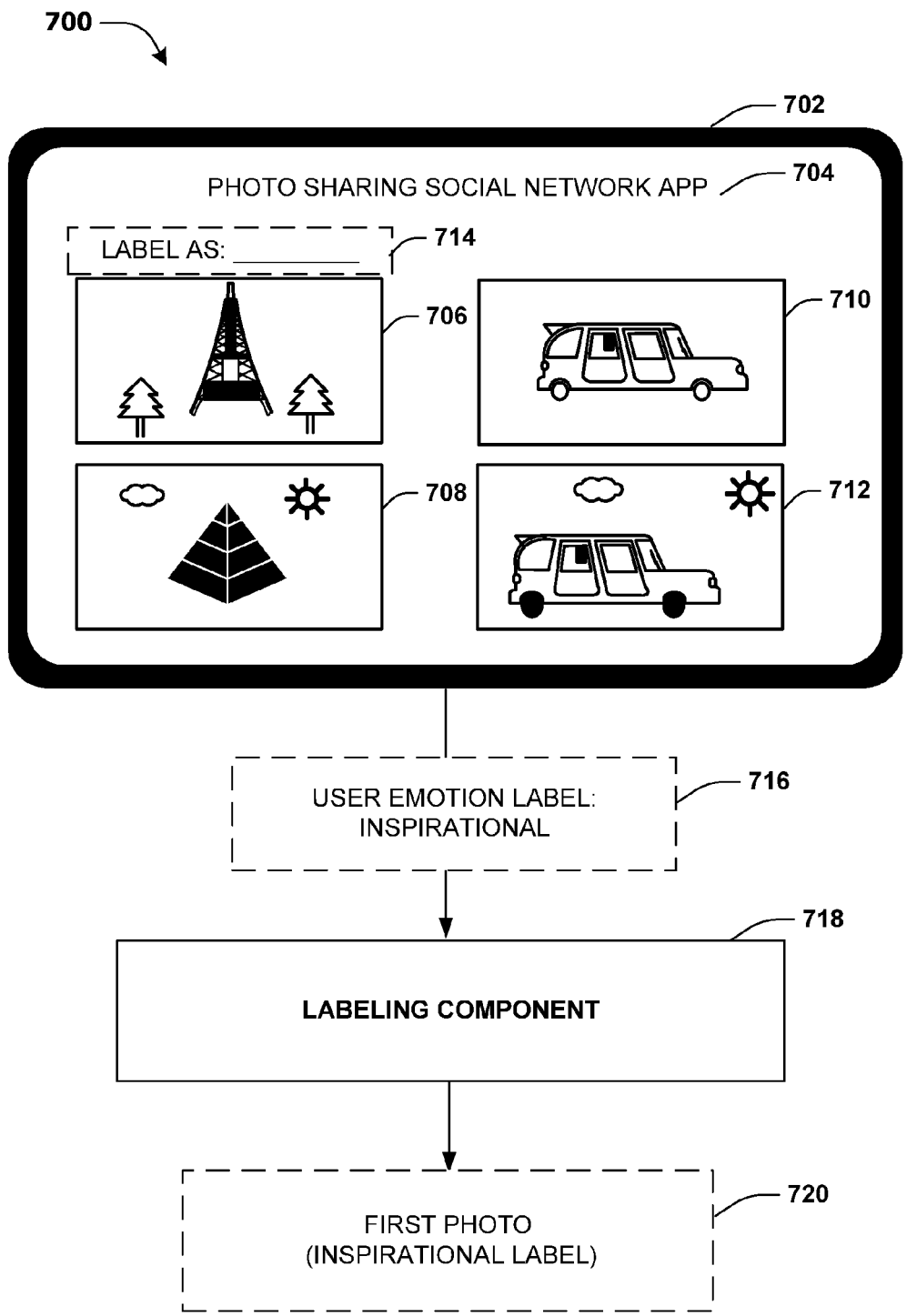
FIG. 7 is a component block diagram illustrating an example system for providing emotionally relevant content to users, where content is labeled using a user emotion label.

FIG. 7 illustrates a system 700, comprising a labeling component 718, configured to label content. The labeling component 718 may be associated with a client device 702 and/or a photo sharing social network app 704 hosted by the client device 702 (e.g., the labeling component 718 may be hosted by an operating system of the client device 702, by a service accessible to the client device 702, integrated into the photo sharing social network app 704, etc.). In an example, a first user of the client device 702 may utilize the photo sharing social network app 704 to view shared photos, such as a first photo 706, a second photo 708, a third photo 710, a fourth photo 712, and/or other content.

The first user may select the first photo 706 (e.g., using a touch gesture). Responsive to the selection, an emotion labeling interface 714 may be provided to the first user. The emotion labeling interface 714 may comprise a user specified emotion input interface through which the first user may specify a user emotion label 716 for the first photo 706. For example, the user may specify an inspirational emotion as the user emotion label 716, which may be received by the labeling component 718. The labeling component 718 may label the first photo with the user emotion label 716 to create a labeled first photo as labeled content 720.

Figure 8A:
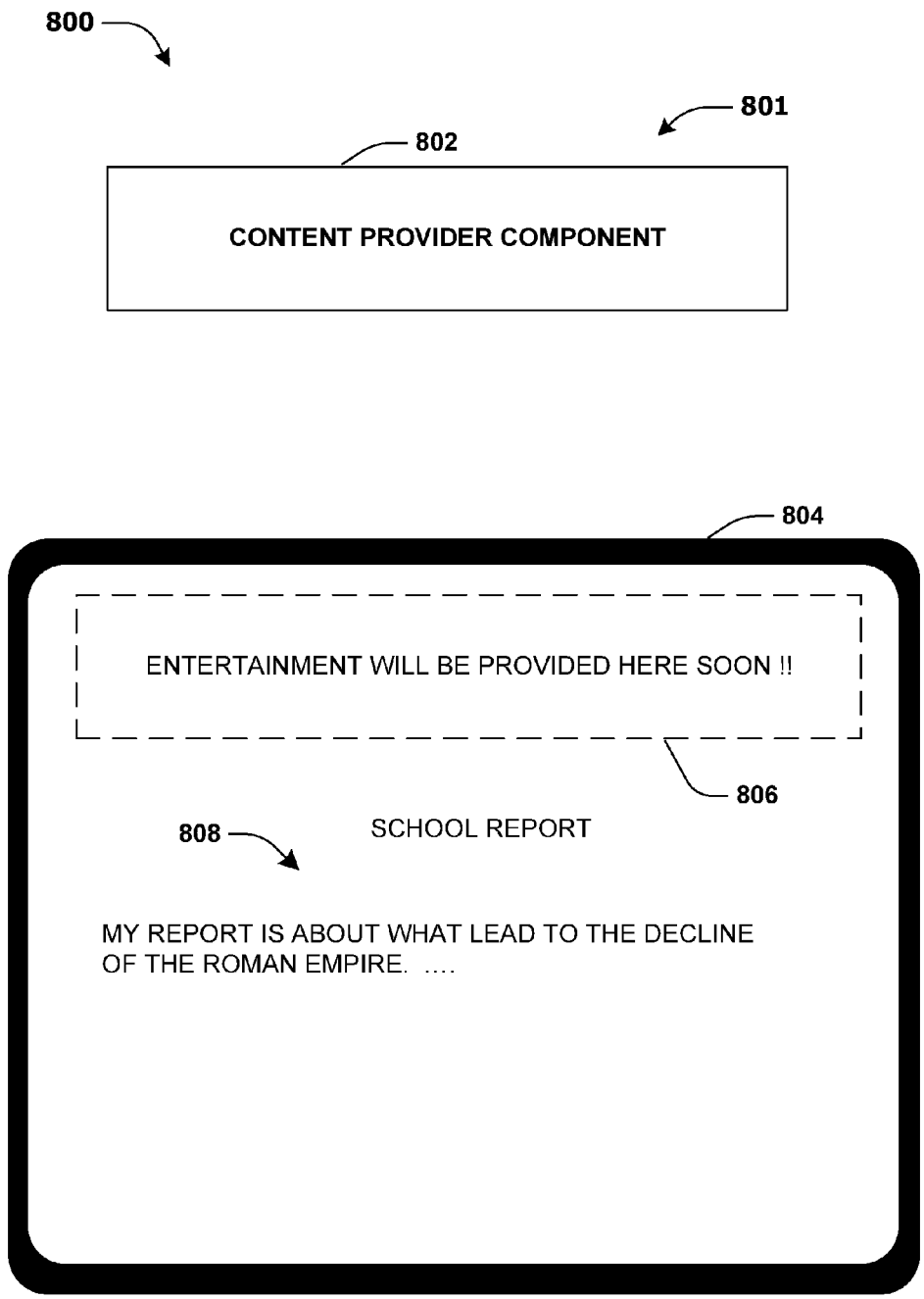
FIG. 8A is a component block diagram illustrating an example system for providing emotionally relevant content to users.
Figure 8B:
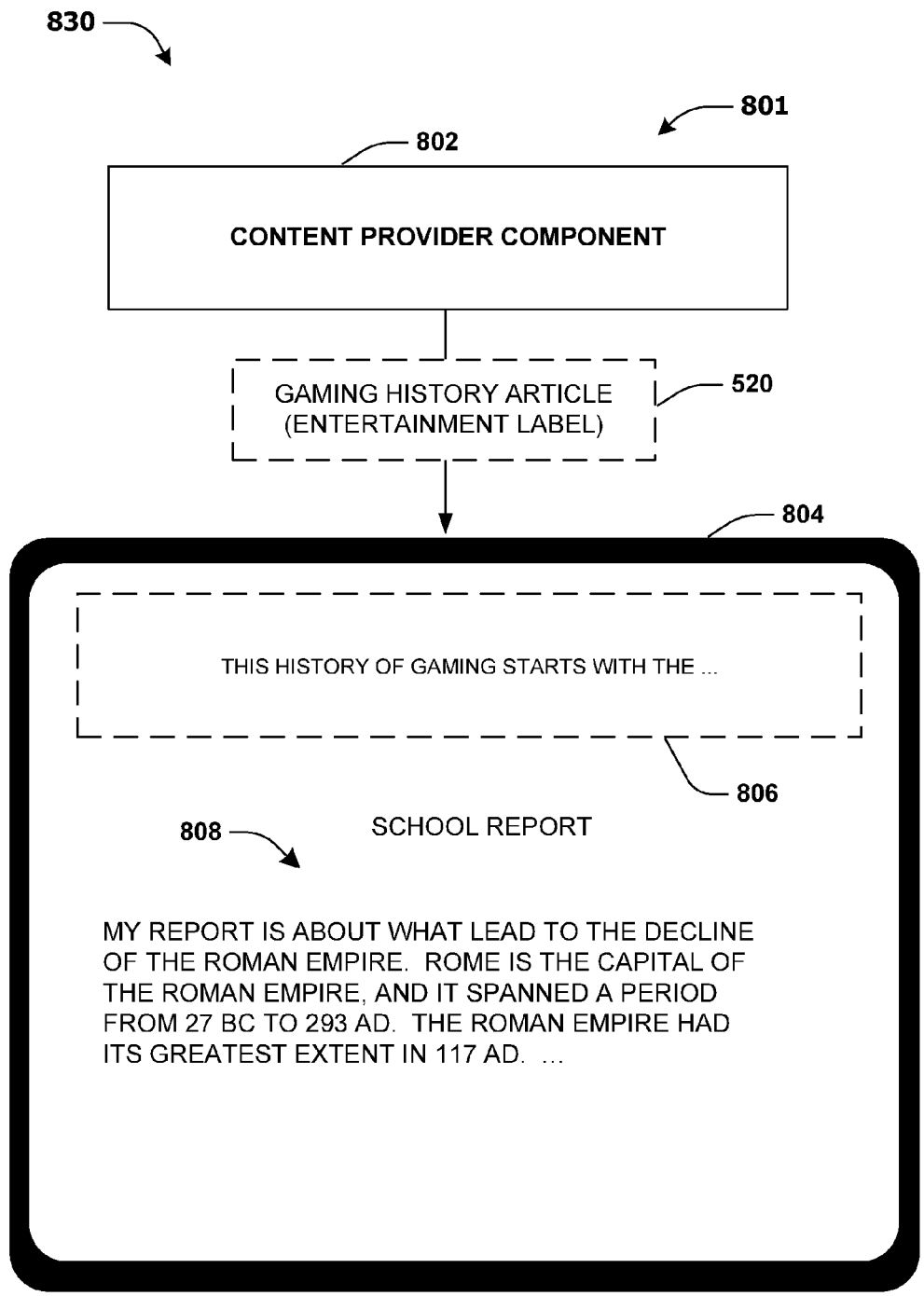
FIG. 8B is a component block diagram illustrating an example system for providing emotionally relevant content to users.
Figure 8C:
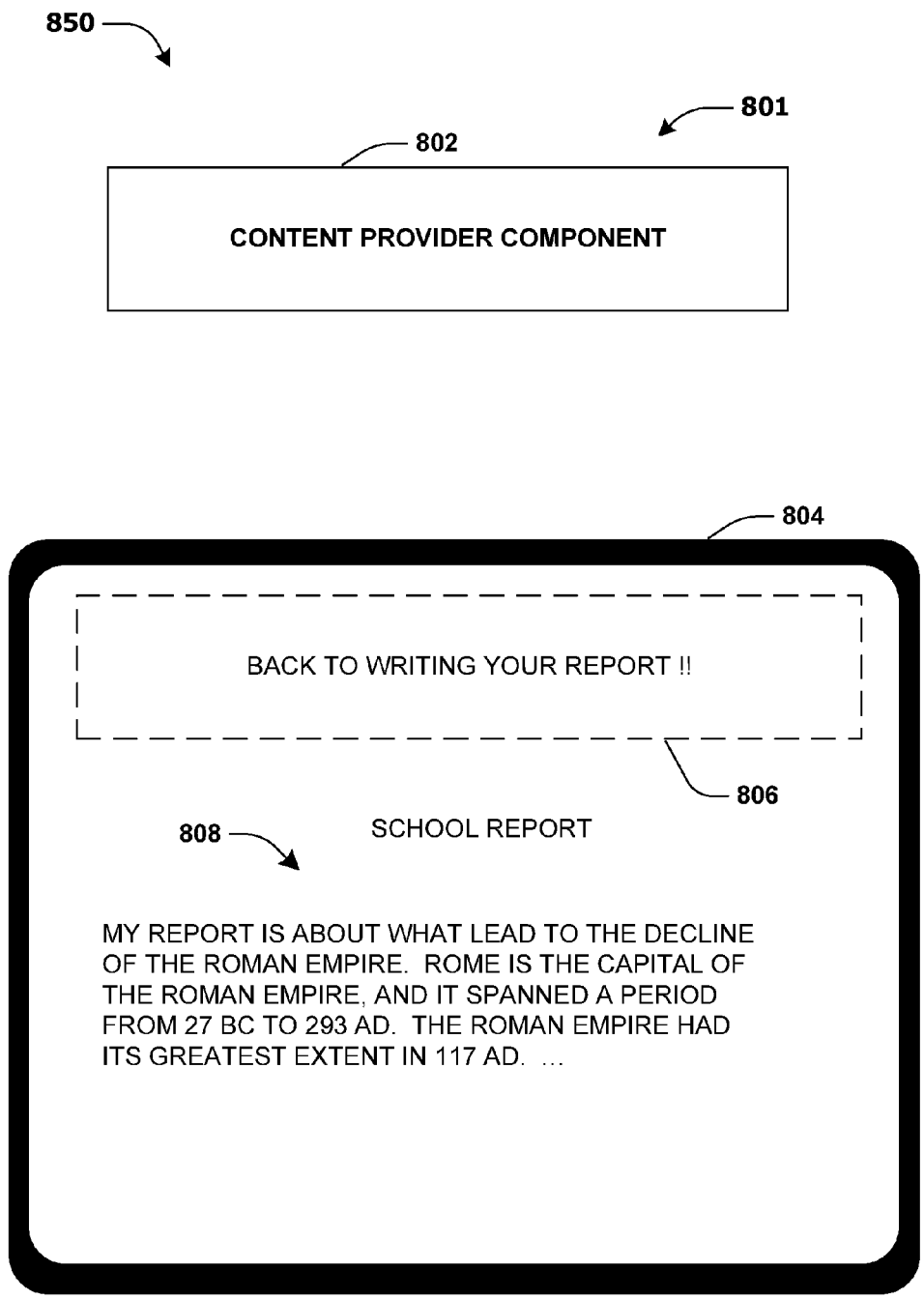
FIG. 8C is a component block diagram illustrating an example system for providing emotionally relevant content to users.

FIGS. 8A-8C illustrate examples of a system 801, comprising a content provider component 802, for providing emotionally relevant content to users. In an example, the content provider component 802 may have access to labeled content that was labeled by users with user emotion labels (e.g., FIGS. 5-7). FIG. 8A illustrates an example 800 where the content provider component 802 may be associated with a client device 804 (e.g., the content provider component 802 may be hosted by a server or service accessible to the client device 804 or may be locally hosted by the client device 804). A second user of the client device 804 may be utilizing a word processing application 808 of the client device 804 to write a school report. An application user interface element 806 may be utilized by the content provider component 802 for displaying labeled content to the second user. The content provider component 802 may define an emotional transition trigger for the second user, such that the content provider component 802 may provide labeled content to the second user through the application user interface element 806 based upon a triggering of the emotional transition trigger. For example, the emotional transition trigger may be triggered based upon the second user having a threshold amount of exposure to a serious emotional content type of content, such as the school report.

FIG. 8B illustrates an example 830 of the content provider component 802 providing labeled content to the second user. For example, the emotional transition trigger may be triggered based upon the second user having met the threshold amount of exposure to the school report (e.g., a threshold amount of time having the word processing application 808 in a foreground state; a threshold amount of characters/words typed; etc.). Accordingly, the content provider component 802 may provide labeled content 520 corresponding to the labeled gaming history article that was labeled by the first user with an entertainment user emotion label (e.g., FIG. 5). For example, the second user may specify an interest in viewing entertainment content as a break from writing the school report. The content provider component 802 may populate the application user interface element 806 with the labeled gaming history article, such as for a threshold amount of time (e.g., the second user or a parent of the second user may specify a 3 minute time limit for the second user to view entertainment content as a break from writing the school report). FIG. 8C illustrates an example 850 where the content provider component 802 removes the gaming history article from the application user interface element 806 and transitioning the second user back to the school report based upon an expiration of the 3 minute time limit.

Figure 9A:
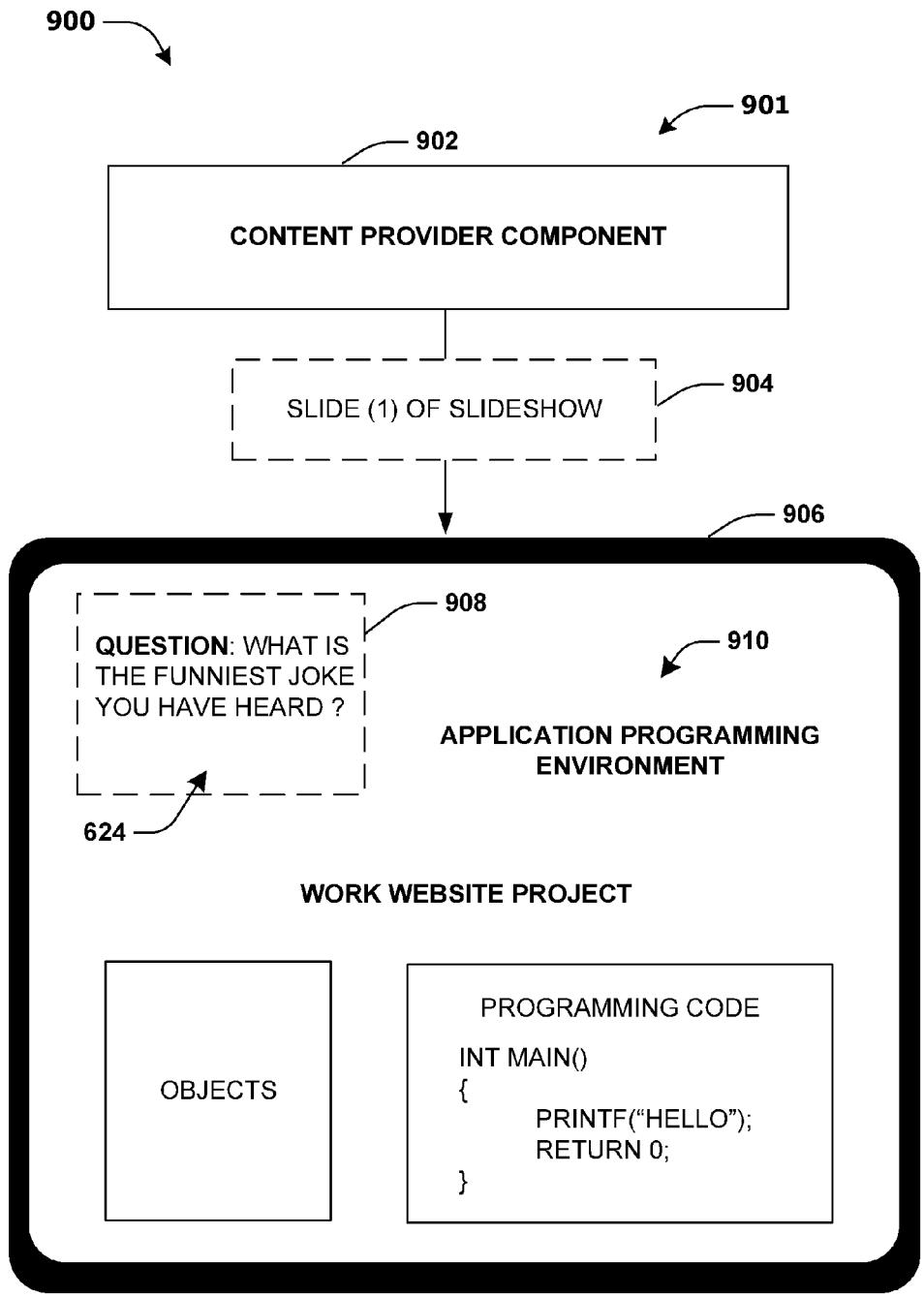
FIG. 9A is a component block diagram illustrating an example system for providing emotionally relevant content to users, where a slide show is displayed to a user.
Figure 9B:
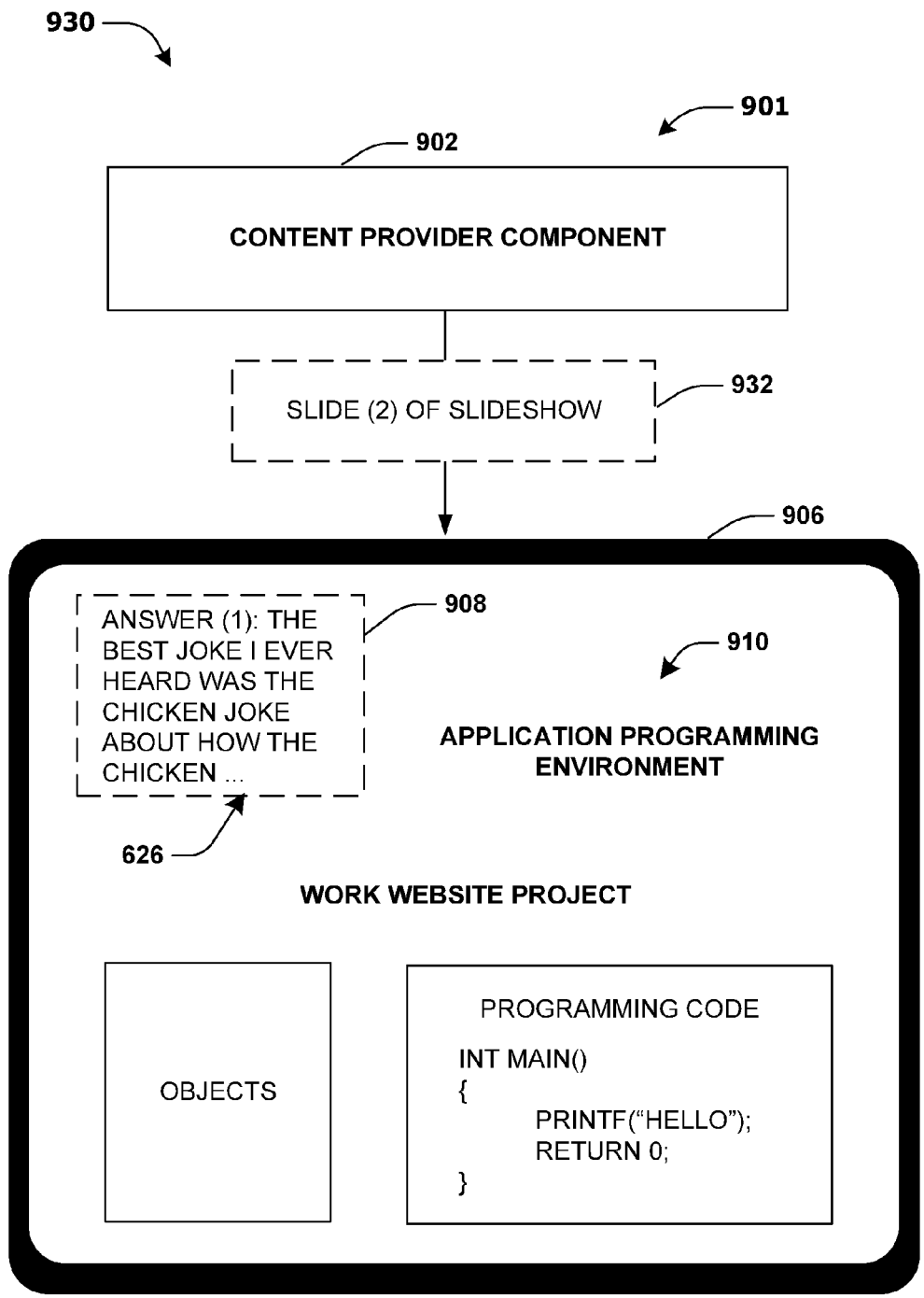
FIG. 9B is a component block diagram illustrating an example system for providing emotionally relevant content to users, where a slide show is updated with additional labeled content.

FIGS. 9A and 9B illustrate examples of a system 901, comprising a content provider component 902, for providing emotionally relevant content to users. In an example, the content provider component 902 may have access to labeled content that was labeled by users with user emotion labels (e.g., FIGS. 5-7). FIG. 9A illustrates an example 900 where the content provider component 902 may be associated with a client device 906 (e.g., the content provider component 902 may be hosted by a server or service accessible to the client device 906 or may be locally hosted by the client device 906). A second user of the client device 906 may be utilizing an application programming environment 910 of the client device 906 to develop a work website project. An application user interface element 908 may be utilized by the content provider component 902 for displaying labeled content to the second user. The content provider component 902 may define an emotional transition trigger for the second user, such that the content provider component 902 may provide labeled content to the second user through the application user interface element 908 based upon a triggering of the emotional transition trigger. For example, the emotional transition trigger may be triggered based upon the second user utilizing the application programming environment 910 for a threshold amount of time. Responsive to a triggering of the emotional transition trigger, the content provider component 902 may provide a slide show of labeled content through the application user interface element 908. For example, a first slide 904 may comprise first labeled content 624 corresponding to a labeled question that was labeled by a first user as funny (e.g., FIG. 6).

FIG. 9B illustrates an example 930 of the content provider 902 updating the slide show. For example, the content provider component 902 may update the slide show, displayed through the application user interface element 908, with a second slide 932. The second slide 932 may comprise second labeled content 626 corresponding to a labeled first answer that was labeled by the first user as funny (e.g., FIG. 6). In this way, the content provider component 902 may provide labeled content to the second user through the application user interface element 908 based upon a slide show view setting.

Figure 10:
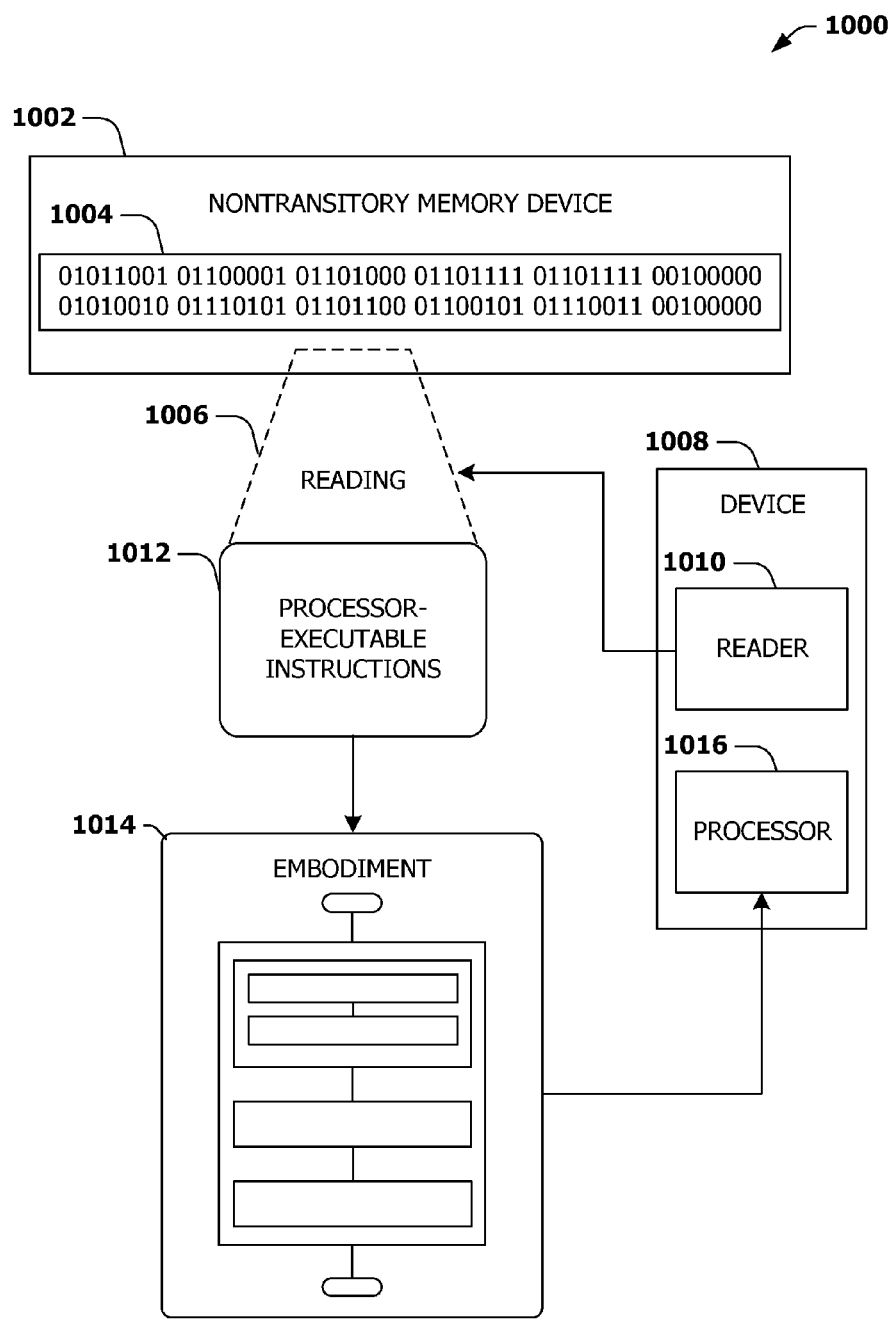
FIG. 10 is an illustration of a scenario featuring an example nontransitory memory device in accordance with one or more of the provisions set forth herein.

FIG. 10 is an illustration of a scenario 1000 involving an example nontransitory memory device 1002. The nontransitory memory device 1002 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1002 stores computer-readable data 1004 that, when subjected to reading 1006 by a reader 1010 of a device 1008 (e.g., a read head of a hard disk drive, or a read operation invoked on a solid-state storage device), express processor-executable instructions 1012. In some embodiments, the processor-executable instructions, when executed on a processor 1016 of the device 1008, are configured to perform a method, such as at least some of the example method 400 of FIG. 4, for example. In some embodiments, the processor-executable instructions, when executed on the processor 1016 of the device 1008, are configured to implement a system, such as at least some of the example system 500 of FIG. 5, at least some of the example system 600 of FIG. 6, at least some of the example system 700 of FIG. 7, at least some of the example system 801 of FIGS. 8A-8C, and/or at least some of the example system 901 of FIGS. 9A and 9B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

The invention claimed is:

1. A method for providing emotionally relevant content to users, comprising:
receiving, from a first user, a user emotion label for content;
labeling the content based upon the user emotion label to create labeled content;
defining an emotional transition trigger, for a second user, corresponding to a user input pattern of the second user indicative of a possible break in consumption of a content type; and
responsive to a triggering of the emotional transition trigger based upon the user input pattern being detected in association with the second user, providing the labeled content to the second user based upon the labeled content corresponding to preferences of the second user.

2. The method of claim 1, the receiving a user emotion label comprising:
providing an emotion labeling interface comprising a set of emotions for selection by the first user; and
receiving a selection of an emotion by the first user, from the emotion labeling interface, as the user emotion label for the content.

3. The method of claim 1, the emotional transition trigger corresponding to at least one of a threshold number of characters typed, a threshold number of words typed, a threshold amount of time over which less than a threshold amount of activity was performed, a threshold amount of time spent performing a task, a threshold amount of time spent using an application or a user request.

4. The method of claim 1, the defining an emotional transition trigger comprising defining a timeout trigger for the content type, and the providing the labeled content comprising responsive to the second user consuming content of the content type for a threshold amount of time corresponding to the timeout trigger, providing the labeled content based upon the labeled content having a second content type different than the content type.

5. The method of claim 4, the content type comprising at least one of a work content type, an educational content type, or a serious content type, and the second content type having at least one of a funny content type, an entertainment content type, or an inspirational content type.

6. The method of claim 1, the emotional transition trigger corresponding to at least one of a threshold amount of time over which less than a threshold amount of activity was performed, a threshold amount of time spent performing a task or a threshold amount of time spent using an application.

7. The method of claim 1, the user input pattern comprising at least one of a typing speed pattern, a click speed pattern, an eye gaze tracking pattern, or a gesture pattern.

8. The method of claim 1, the providing the labeled content comprising:
displaying the labeled content through at least one of a website interface element of a website with which the second user is engaged or an application interface element of an application with which the second user is engaged.

9. The method of claim 1, the providing the labeled content comprising:
displaying the labeled content through a slide show; and
updating the slide show with additional labeled content based upon a slide show view setting.

10. The method of claim 1, the providing the labeled content comprising:
providing the labeled content to the second user responsive to the user emotion label corresponding to a user emotion preference specified by the second user.

11. The method of claim 1, the labeled content having a second content type, and the providing the labeled content comprising:
determining that the emotional transition trigger triggered based upon the second user having a threshold amount of exposure to the content type of content that is different than the second content type;
providing the labeled content to the second user for a threshold amount of time; and
responsive to expiration of the threshold amount of time:
removing the labeled content; and
transitioning the second user to the content type of content.

12. The method of claim 1, the content comprising at least one of a website, a website element, a question from a question and answer service, a user interface element of an application, an answer from the question and answer service, video content, an image, a social network post, an article, textual content, or audio content.

13. The method of claim 1, the user emotion label corresponding to a first emotion label type, and the labeling the content comprising:
responsive to receiving a threshold number of user emotion labels, of the first emotion label type, for the content from a plurality of users, labeling the content with the user emotion label.

14. The method of claim 1, the labeling the content comprising:
assigning a rank to the user emotion label based upon at least one of a number of users that labeled the content with the user emotion label, a rate at which users labeled the content with the user emotion label, a percentage of content that is labeled with the user emotion label, a percentage of content that is not labeled with a user emotion label, or a percentage of content that is labeled with a different user emotion label; and
responsive to the rank being above a threshold rank, labeling the content with the user emotion label.

15. A system for providing emotionally relevant content to users, comprising:
one or more processors; and
memory storing instructions that when executed by at least one of the one or more processors, implement:
a labeling component configured to:
receive, from a first user, a user emotion label for content; and
label the content based upon the user emotion label to create labeled content, the labeled content having a first content type; and
a content provider component configured to:
define an emotional transition trigger, for a second user, corresponding to a threshold amount of exposure to a second content type of content that is different than the first content type; and
responsive to a triggering of the emotional transition trigger based upon the second user having the threshold amount of exposure to the second content type of content, provide the labeled content to the second user based upon the labeled content corresponding to preferences of the second user.

16. The system of claim 15, the labeling component configured to:
    provide an emotion labeling interface comprising a set of emotions for selection by the first user; and
    receive a selection of an emotion by the first user, from the emotion labeling interface, as the user emotion label for the content.

17. The system of claim 15, the content provider component configured to:
    display the labeled content through at least one of a website interface element of a website with which the second user is engaged or an application interface element of an application with which the second user is engaged.

18. The system of claim 15, the content provider component configured to:
    display the labeled content through a slide show; and
    update the slide show with additional labeled content based upon a slide show view setting.

19. The system of claim 15, the content provider component configured to:
    provide the labeled content to the second user responsive to the user emotion label corresponding to a user emotion preference specified by the second user.

20. A non-transitory computer readable medium storing computer executable instructions that when executed by a processor perform a method for providing relevant content to users, comprising:
    receiving, from a first user, a user label for content;
    labeling the content based upon the user label to create labeled content;
    defining a transition trigger, for a second user, corresponding to at least one of a user input pattern of the second user or a threshold amount of exposure to second content by the second user; and
    responsive to a triggering of the transition trigger based upon at least one of the user input pattern being detected in association with the second user or the second user having the threshold amount of exposure to the second content, providing the labeled content to the second user, the labeled content corresponding to preferences of the second user.

* * * * *